United States Patent
Natanzon et al.

(10) Patent No.: US 10,496,487 B1
(45) Date of Patent: Dec. 3, 2019

(54) STORING SNAPSHOT CHANGES WITH SNAPSHOTS

(71) Applicant: EMC Corporation, Hopkinton, MA (US)

(72) Inventors: Assaf Natanzon, Tel Aviv (IL); Saar Cohen, Moshav Mishmeret (IL); Anestis Panidis, Saratoga, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 620 days.

(21) Appl. No.: 14/559,036

(22) Filed: Dec. 3, 2014

(51) Int. Cl.
*G06F 11/14* (2006.01)
*G06F 16/11* (2019.01)

(52) U.S. Cl.
CPC ...... *G06F 11/1451* (2013.01); *G06F 11/1446* (2013.01); *G06F 16/128* (2019.01)

(58) Field of Classification Search
CPC .......... G06F 11/1451; G06F 17/30088; G06F 11/1446; G06F 16/128
See application file for complete search history.

(56) References Cited

U.S. PATENT DOCUMENTS

| | | |
|---|---|---|
| 5,170,480 A | 12/1992 | Mohan et al. |
| 5,249,053 A | 9/1993 | Jain |
| 5,388,254 A | 2/1995 | Betz et al. |
| 5,499,367 A | 3/1996 | Bamford et al. |
| 5,526,397 A | 6/1996 | Lohman |
| 5,864,837 A | 1/1999 | Maimone |
| 5,990,899 A | 1/1999 | Whitten |
| 5,879,459 A | 3/1999 | Gadgil et al. |
| 6,042,652 A | 3/2000 | Hyun et al. |
| 6,065,018 A | 5/2000 | Beier et al. |
| 6,143,659 A | 11/2000 | Leem |
| 6,148,340 A | 11/2000 | Bittinger et al. |
| 6,174,377 B1 | 1/2001 | Doering et al. |
| 6,174,809 B1 | 1/2001 | Kang et al. |
| 6,203,613 B1 | 3/2001 | Gates et al. |
| 6,260,125 B1 | 7/2001 | McDowell |
| 6,270,572 B1 | 8/2001 | Kim et al. |
| 6,272,534 B1 | 8/2001 | Guha |
| 6,287,965 B1 | 9/2001 | Kang et al. |
| 6,467,023 B1 | 10/2002 | DeKoning et al. |
| 6,574,657 B1 | 6/2003 | Dickinson |
| 6,621,493 B1 | 9/2003 | Whitten |
| 6,804,676 B1 | 10/2004 | Bains, II |

(Continued)

FOREIGN PATENT DOCUMENTS

| | | |
|---|---|---|
| EP | 1154356 | 11/2001 |
| WO | WO 00 45581 A3 | 8/2000 |

OTHER PUBLICATIONS

U.S. Non-Final Office Action dated Aug. 25, 2016 corresponding to U.S. Appl. No. 14/559,031; 35 Pages.

(Continued)

*Primary Examiner* — Pierre M Vital
*Assistant Examiner* — Andalib F Lodhi
(74) *Attorney, Agent, or Firm* — Daly, Crowley Mofford & Durkee, LLP

(57) ABSTRACT

In one aspect, a method includes sending a first snapshot of a volume at a production site to a backup device at a replication site, sending a second snapshot of the volume to the backup device and sending metadata of differences between the first and second snapshots to the backup device.

20 Claims, 6 Drawing Sheets

(56) References Cited

U.S. PATENT DOCUMENTS

| | | |
|---|---|---|
| 6,947,981 B2 | 9/2005 | Lubbers et al. |
| 7,043,610 B2 | 5/2006 | Horn et al. |
| 7,051,126 B1 | 5/2006 | Franklin |
| 7,076,620 B2 | 7/2006 | Takeda et al. |
| 7,111,197 B2 | 9/2006 | Kingsbury et al. |
| 7,117,327 B2 | 10/2006 | Hlrakawa et al. |
| 7,120,768 B2 | 10/2006 | Mizuno et al. |
| 7,130,975 B2 | 10/2006 | Suishu et al. |
| 7,139,927 B2 | 11/2006 | Park et al. |
| 7,159,088 B2 | 1/2007 | Hirakawa et al. |
| 7,167,963 B2 | 1/2007 | Hirakawa et al. |
| 7,203,741 B2 | 4/2007 | Marco et al. |
| 7,222,136 B1 | 5/2007 | Brown et al. |
| 7,296,008 B2 | 11/2007 | Passerini et al. |
| 7,328,373 B2 | 2/2008 | Kawamura et al. |
| 7,353,335 B2 | 4/2008 | Kawamura |
| 7,360,113 B2 | 4/2008 | Anderson et al. |
| 7,426,618 B2 | 9/2008 | Vu et al. |
| 7,516,287 B2 | 4/2009 | Ahal et al. |
| 7,519,625 B2 | 4/2009 | Honami et al. |
| 7,519,628 B1 | 4/2009 | Leverett |
| 7,546,485 B2 | 6/2009 | Cochran et al. |
| 7,577,867 B2 | 8/2009 | Lewin et al. |
| 7,590,887 B2 | 9/2009 | Kano |
| 7,606,940 B2 | 10/2009 | Yamagami |
| 7,627,612 B2 | 12/2009 | Ahal et al. |
| 7,627,687 B2 | 12/2009 | Ahal et al. |
| 7,719,443 B1 | 5/2010 | Natanzon |
| 7,757,057 B2 | 7/2010 | Sangapu et al. |
| 7,774,565 B2 | 8/2010 | Lewin et al. |
| 7,797,358 B1 | 9/2010 | Ahal et al. |
| 7,840,536 B1 | 11/2010 | Ahal et al. |
| 7,840,662 B1 | 11/2010 | Natenzon |
| 7,844,856 B1 | 11/2010 | Ahal et al. |
| 7,660,836 B2 | 12/2010 | Natanzon et al. |
| 7,849,361 B2 | 12/2010 | Ahal et al. |
| 7,882,286 B1 | 2/2011 | Natanzon et al. |
| 7,934,262 B1 | 4/2011 | Natanzon et al. |
| 7,958,372 B1 | 6/2011 | Natanzon |
| 8,037,162 B2 | 10/2011 | Marco et al. |
| 8,041,940 B1 | 10/2011 | Natanzon et al. |
| 8,060,713 B1 | 11/2011 | Natanzon |
| 8,060,714 B1 | 11/2011 | Natanzon |
| 8,095,756 B1 * | 1/2012 | Somavarapu ....... G06F 11/1453 711/162 |
| 8,103,937 B1 | 1/2012 | Natanzon et al. |
| 8,108,634 B1 | 1/2012 | Natanzon et al. |
| 8,205,009 B2 | 6/2012 | Hellen et al. |
| 8,214,612 B1 | 7/2012 | Natanzon |
| 8,250,149 B2 | 8/2012 | Marco et al. |
| 8,271,441 B1 | 9/2012 | Notanzon et al. |
| 8,271,447 B1 | 9/2012 | Natanzon et al. |
| 8,332,687 B1 | 12/2012 | Natanzon et al. |
| 8,335,761 B1 | 12/2012 | Natanzon |
| 8,335,771 B1 | 12/2012 | Natanzon et al. |
| 8,341,115 B1 | 12/2012 | Natanzon et al. |
| 8,370,648 B1 | 2/2013 | Natanzon |
| 8,380,885 B1 | 2/2013 | Natanzon |
| 8,392,680 B1 | 3/2013 | Natanzon et al. |
| 8,429,362 B1 | 4/2013 | Natanzon et al. |
| 8,433,869 B1 | 4/2013 | Natenzon et al. |
| 8,438,135 B1 | 5/2013 | Natanzon et al. |
| 8,464,101 B1 | 6/2013 | Natanzon et al. |
| 8,478,955 B1 | 7/2013 | Natanzon et al. |
| 8,495,304 B1 | 7/2013 | Natanzon et al. |
| 8,510,279 B1 | 8/2013 | Natanzon et al. |
| 8,521,691 B1 | 8/2013 | Natanzon |
| 8,521,694 B1 | 8/2013 | Natanzon |
| 8,543,609 B1 | 9/2013 | Natanzon |
| 8,583,885 B1 | 11/2013 | Natanzon |
| 8,589,350 B1 | 11/2013 | Lalonde et al. |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,676,763 B2 | 3/2014 | Goodman et al. |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,751,828 B1 | 6/2014 | Raizen et al. |
| 8,769,336 B1 | 7/2014 | Natanzon et al. |
| 8,745,004 B1 | 8/2014 | Natanzon et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,409 B1 | 11/2014 | Natanzon et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,977,593 B1 | 3/2015 | Natanzon et al. |
| 8,977,826 B1 | 3/2015 | Meiri et al. |
| 8,996,460 B1 | 3/2015 | Frank et al. |
| 8,996,461 B1 | 3/2015 | Natanzon et al. |
| 8,996,827 B1 | 3/2015 | Natanzon |
| 9,003,138 B1 | 4/2015 | Natanzon et al. |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,063,994 B1 | 6/2015 | Natanzon et al. |
| 9,069,479 B1 | 6/2015 | Natanzon |
| 9,069,709 B1 | 6/2015 | Natanzon et al. |
| 9,075,810 B2 | 7/2015 | Banerjee |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 9,146,878 B1 | 9/2015 | Cohen et al. |
| 9,152,339 B1 | 10/2015 | Cohen et al. |
| 9,152,578 B1 | 10/2015 | Saad et al. |
| 9,152,814 B1 | 10/2015 | Natanzon |
| 9,158,578 B1 | 10/2015 | Derbeko et al. |
| 9,158,630 B1 | 10/2015 | Natanzon |
| 9,160,526 B1 | 10/2015 | Raizen et al. |
| 9,177,670 B1 | 11/2015 | Derbeko et al. |
| 9,189,339 B1 | 11/2015 | Cohen et al. |
| 9,189,341 B1 | 11/2015 | Natanzon et al. |
| 9,201,736 B1 | 12/2015 | Moore et al. |
| 9,223,659 B1 | 12/2015 | Natanzon et al. |
| 9,225,529 B1 | 12/2015 | Natanzon et al. |
| 9,235,481 B1 | 1/2016 | Natanzon et al. |
| 9,235,524 B1 | 1/2016 | Derbeko et al. |
| 9,235,632 B1 | 1/2016 | Natanzon |
| 9,244,997 B1 | 1/2016 | Natanzon et al. |
| 9,256,605 B1 | 2/2016 | Natanzon |
| 9,274,718 B1 | 3/2016 | Natanzon et al. |
| 9,275,063 B1 | 3/2016 | Natanzon |
| 9,286,052 B1 | 3/2016 | Solan et al. |
| 9,305,009 B1 | 4/2016 | Bono et al. |
| 9,323,750 B2 | 4/2016 | Natanzon et al. |
| 9,330,155 B1 | 5/2016 | Bono et al. |
| 9,336,094 B1 | 5/2016 | Wolfson et al. |

(56) References Cited

U.S. PATENT DOCUMENTS

| | | |
|---|---|---|
| 9,336,230 B1 | 5/2016 | Natanzon |
| 9,367,260 B1 | 6/2016 | Natanzon |
| 9,378,096 B1 | 6/2016 | Erel et al. |
| 9,378,219 B1 | 6/2016 | Bono et al. |
| 9,378,261 B1 | 6/2016 | Bono et al. |
| 9,383,937 B1 | 7/2016 | Frank et al. |
| 9,389,800 B1 | 7/2016 | Natanzon et al. |
| 9,405,481 B1 | 8/2016 | Cohen et al. |
| 9,405,684 B1 | 8/2016 | Derbeko et al. |
| 9,405,765 B1 | 8/2016 | Natanzon |
| 9,411,535 B1 | 8/2016 | Shemer et al. |
| 9,459,804 B1 | 10/2016 | Natanzon et al. |
| 9,460,028 B1 | 10/2016 | Raizen et al. |
| 9,471,579 B1 | 10/2016 | Natanzon |
| 9,477,407 B1 | 10/2016 | Marshak et al. |
| 9,501,542 B1 | 11/2016 | Natanzon |
| 9,507,732 B1 | 11/2016 | Natanzon et al. |
| 9,507,845 B1 | 11/2016 | Natanzon et al. |
| 9,514,138 B1 | 12/2016 | Natanzon et al. |
| 9,524,218 B1 | 12/2016 | Veprinsky et al. |
| 9,529,885 B1 | 12/2016 | Natanzon et al. |
| 9,535,800 B1 | 1/2017 | Natanzon et al. |
| 9,535,801 B1 | 1/2017 | Natanzon et al. |
| 9,547,459 B1 | 1/2017 | BenHanokh et al. |
| 9,547,591 B1 | 1/2017 | Natanzon et al. |
| 9,552,405 B1 | 1/2017 | Moore et al. |
| 9,557,921 B1 | 1/2017 | Cohen et al. |
| 9,557,925 B1 | 1/2017 | Natanzon |
| 9,563,517 B1 | 2/2017 | Natanzon et al. |
| 9,563,684 B1 | 2/2017 | Natanzon et al. |
| 9,575,851 B1 | 2/2017 | Natanzon et al. |
| 9,575,857 B1 | 2/2017 | Natanzon |
| 9,575,894 B1 | 2/2017 | Natanzon et al. |
| 9,582,382 B1 | 2/2017 | Natanzon et al. |
| 9,588,703 B1 | 3/2017 | Natanzon et al. |
| 9,588,847 B1 | 3/2017 | Natanzon et al. |
| 9,594,822 B1 | 3/2017 | Natanzon et al. |
| 9,600,377 B1 | 3/2017 | Cohen et al. |
| 9,619,255 B1 | 4/2017 | Natanzon |
| 9,619,256 B1 | 4/2017 | Natanzon et al. |
| 9,619,264 B1 | 4/2017 | Natanzon et al. |
| 9,619,543 B1 | 4/2017 | Natanzon et al. |
| 9,632,881 B1 | 4/2017 | Natanzon |
| 9,639,295 B1 | 5/2017 | Natanzon et al. |
| 9,639,383 B1 | 5/2017 | Natanzon |
| 9,639,592 B1 | 5/2017 | Natanzon et al. |
| 9,652,333 B1 | 5/2017 | Bournival et al. |
| 9,658,929 B1 | 5/2017 | Natanzon et al. |
| 9,659,074 B1 | 5/2017 | Natanzon et al. |
| 9,665,305 B1 | 5/2017 | Natanzon et al. |
| 9,668,704 B2 | 6/2017 | Fuimaono et al. |
| 9,672,117 B1 | 6/2017 | Natanzon et al. |
| 9,678,680 B1 | 6/2017 | Natanzon et al. |
| 9,678,728 B1 | 6/2017 | Shemer et al. |
| 9,684,576 B1 | 6/2017 | Natanzon et al. |
| 9,690,504 B1 | 6/2017 | Natanzon et al. |
| 9,696,939 B1 | 7/2017 | Frank et al. |
| 9,710,177 B1 | 7/2017 | Natanzon |
| 9,720,618 B1 | 8/2017 | Panidis et al. |
| 9,722,788 B1 | 8/2017 | Natanzon et al. |
| 9,727,429 B1 | 8/2017 | Moore et al. |
| 9,733,969 B2 | 8/2017 | Derbeko et al. |
| 9,737,111 B2 | 8/2017 | Lustik |
| 9,740,572 B1 | 8/2017 | Natanzon et al. |
| 9,740,573 B1 | 8/2017 | Natanzon |
| 9,740,880 B1 | 8/2017 | Natanzon et al. |
| 9,749,300 B1 | 8/2017 | Cale et al. |
| 9,772,789 B1 | 9/2017 | Natanzon et al. |
| 9,798,472 B1 | 10/2017 | Natanzon et al. |
| 9,798,490 B1 | 10/2017 | Natanzon |
| 9,804,934 B1 | 10/2017 | Natanzon et al. |
| 9,811,431 B1 | 11/2017 | Natanzon et al. |
| 9,823,865 B1 | 11/2017 | Natanzon et al. |
| 9,823,973 B1 | 11/2017 | Natanzon |
| 9,832,261 B2 | 11/2017 | Don et al. |
| 9,846,698 B1 | 12/2017 | Panidis et al. |
| 9,875,042 B1 | 1/2018 | Natanzon et al. |
| 9,875,162 B1 | 1/2018 | Panidis et al. |
| 9,880,777 B1 | 1/2018 | Bono et al. |
| 9,881,014 B1 | 1/2018 | Bono et al. |
| 9,910,620 B1 | 3/2018 | Veprinsky et al. |
| 9,910,621 B1 | 3/2018 | Golan et al. |
| 9,910,735 B1 | 3/2018 | Natanzon |
| 9,910,739 B1 | 3/2018 | Natanzon et al. |
| 9,917,854 B2 | 3/2018 | Natanzon et al. |
| 9,921,955 B1 | 3/2018 | Derbeko et al. |
| 9,933,957 B1 | 4/2018 | Cohen et al. |
| 9,934,302 B1 | 4/2018 | Cohen et al. |
| 9,940,205 B2 | 4/2018 | Natanzon |
| 9,940,460 B1 | 4/2018 | Derbeko et al. |
| 9,946,649 B1 | 4/2018 | Natanzon et al. |
| 9,959,061 B1 | 5/2018 | Natanzon et al. |
| 9,965,306 B1 | 5/2018 | Natanzon et al. |
| 9,990,256 B1 | 6/2018 | Natanzon |
| 9,996,539 B1 | 6/2018 | Natanzon |
| 10,007,626 B1 | 6/2018 | Saad et al. |
| 10,019,194 B1 | 7/2018 | Baruch et al. |
| 10,025,931 B1 | 7/2018 | Natanzon et al. |
| 10,031,675 B1 | 7/2018 | Veprinsky et al. |
| 10,031,690 B1 | 7/2018 | Panidis et al. |
| 10,031,692 B2 | 7/2018 | Elron et al. |
| 10,031,703 B1 | 7/2018 | Natanzon et al. |
| 10,037,251 B1 | 7/2018 | Bono et al. |
| 10,042,579 B1 | 8/2018 | Natanzon |
| 10,042,751 B1 | 8/2018 | Veprinsky et al. |
| 10,055,146 B1 | 8/2018 | Natanzon et al. |
| 10,055,148 B1 | 8/2018 | Natanzon et al. |
| 10,061,666 B1 | 8/2018 | Natanzon et al. |
| 10,067,694 B1 | 9/2018 | Natanzon et al. |
| 10,067,837 B1 | 9/2018 | Natanzon et al. |
| 10,078,459 B1 | 9/2018 | Natanzon et al. |
| 10,082,980 B1 | 9/2018 | Cohen et al. |
| 10,083,093 B1 | 9/2018 | Natanzon et al. |
| 10,095,489 B1 | 10/2018 | Lieberman et al. |
| 10,101,943 B1 | 10/2018 | Ayzenberg et al. |
| 10,108,356 B1 | 10/2018 | Natanzon et al. |
| 10,108,507 B1 | 10/2018 | Natanzon |
| 10,108,645 B1 | 10/2018 | Bigman et al. |
| 10,114,581 B1 | 10/2018 | Natanzon et al. |
| 10,120,787 B1 | 11/2018 | Shemer et al. |
| 10,120,925 B1 | 11/2018 | Natanzon et al. |
| 10,126,946 B1 | 11/2018 | Natanzon et al. |
| 10,133,874 B1 | 11/2018 | Natanzon et al. |
| 10,140,039 B1 | 11/2018 | Baruch et al. |
| 10,146,436 B1 | 12/2018 | Natanzon et al. |
| 10,146,639 B1 | 12/2018 | Natanzon et al. |
| 10,146,675 B1 | 12/2018 | Shemer et al. |
| 10,146,961 B1 | 12/2018 | Baruch et al. |
| 10,148,751 B1 | 12/2018 | Natanzon |
| 10,152,246 B1 | 12/2018 | Lieberman et al. |
| 10,152,267 B1 | 12/2018 | Ayzenberg et al. |
| 10,152,384 B1 | 12/2018 | Amit et al. |
| 10,157,014 B1 | 12/2018 | Panidis et al. |
| 10,185,583 B1 | 1/2019 | Natanzon et al. |
| 10,191,677 B1 | 1/2019 | Natanzon et al. |
| 10,191,687 B1 | 1/2019 | Baruch et al. |
| 10,191,755 B1 | 1/2019 | Natanzon et al. |
| 10,203,904 B1 | 2/2019 | Natanzon et al. |
| 10,210,073 B1 | 2/2019 | Baruch et al. |
| 10,223,007 B1 | 3/2019 | Natanzon et al. |
| 10,223,023 B1 | 3/2019 | Natanzon et al. |
| 10,223,131 B1 | 3/2019 | Lieberman et al. |
| 10,229,006 B1 | 3/2019 | Natanzon et al. |
| 10,229,056 B1 | 3/2019 | Panidis et al. |
| 10,235,055 B1 | 3/2019 | Saad et al. |
| 10,235,060 B1 | 3/2019 | Baruch et al. |
| 10,235,061 B1 | 3/2019 | Natanzon et al. |
| 10,235,064 B1 | 3/2019 | Natanzon et al. |
| 10,235,087 B1 | 3/2019 | Baruch et al. |
| 10,235,088 B1 | 3/2019 | Baruch et al. |
| 10,235,090 B1 | 3/2019 | Baruch et al. |
| 10,235,091 B1 | 3/2019 | Ayzenberg et al. |
| 10,235,092 B1 | 3/2019 | Natanzon et al. |
| 10,235,145 B1 | 3/2019 | Natanzon et al. |

(56) References Cited

U.S. PATENT DOCUMENTS

| | | | |
|---|---|---|---|
| 10,235,196 | B1 | 3/2019 | Natanzon et al. |
| 10,235,247 | B1 | 3/2019 | Natanzon et al. |
| 10,235,249 | B1 | 3/2019 | Natanzon et al. |
| 10,235,252 | B1 | 3/2019 | Lieberman et al. |
| 10,250,679 | B1 | 4/2019 | Natanzon et al. |
| 10,255,137 | B1 | 4/2019 | Panidis et al. |
| 10,255,291 | B1 | 4/2019 | Natanzon et al. |
| 2002/0129168 | A1 | 9/2002 | Kanai et al. |
| 2003/0048842 | A1 | 3/2003 | Fourquin et al. |
| 2003/0061537 | A1 | 3/2003 | Cha et al. |
| 2003/0110278 | A1 | 6/2003 | Anderson |
| 2003/0131278 | A1 | 7/2003 | Fujibayashi |
| 2003/0145317 | A1 | 7/2003 | Chamberlain |
| 2003/0196147 | A1 | 10/2003 | Hirata et al. |
| 2004/0205092 | A1 | 10/2004 | Longo et al. |
| 2004/0250032 | A1 | 12/2004 | Ji et al. |
| 2004/0254964 | A1 | 12/2004 | Kodama et al. |
| 2005/0015663 | A1* | 1/2005 | Armangau .......... G06F 11/2074 714/15 |
| 2005/0028022 | A1 | 2/2005 | Arnano |
| 2005/0049924 | A1 | 3/2005 | DeBettencourt et al. |
| 2005/0172092 | A1 | 8/2005 | Lam et al. |
| 2005/0273655 | A1 | 12/2005 | Chow et al. |
| 2006/0031647 | A1 | 2/2006 | Hirakawa et al. |
| 2006/0047996 | A1 | 3/2006 | Anderson et al. |
| 2006/0064416 | A1 | 3/2006 | Sim-Tang |
| 2006/0107007 | A1 | 5/2006 | Hirakawa et al. |
| 2006/0117211 | A1 | 6/2006 | Matsunami et al. |
| 2006/0161810 | A1 | 7/2006 | Bao |
| 2006/0179343 | A1 | 8/2006 | Kitamura |
| 2006/0195670 | A1 | 8/2006 | Iwamura et al. |
| 2006/0212462 | A1 | 9/2006 | Hellen et al. |
| 2007/0055833 | A1 | 3/2007 | Vu et al. |
| 2007/0094467 | A1* | 4/2007 | Yamasaki ........... G06F 11/2082 711/162 |
| 2007/0162513 | A1 | 7/2007 | Lewin et al. |
| 2007/0180304 | A1 | 8/2007 | Kano |
| 2007/0198602 | A1 | 8/2007 | Ngo et al. |
| 2007/0198791 | A1 | 8/2007 | Iwamura et al. |
| 2007/0220311 | A1 | 9/2007 | Lewin et al. |
| 2007/0245105 | A1* | 10/2007 | Suzuki ................ G06F 11/1451 711/162 |
| 2007/0266053 | A1 | 11/2007 | Ahal et al. |
| 2008/0082591 | A1 | 4/2008 | Ahal et al. |
| 2008/0082592 | A1 | 4/2008 | Ahal et al. |
| 2008/0082770 | A1 | 4/2008 | Ahal et al. |
| 2010/0082553 | A1* | 4/2010 | Beatty ................ G06F 11/1469 707/679 |
| 2013/0304788 | A1 | 11/2013 | DeLuca et al. |
| 2014/0089264 | A1* | 3/2014 | Talagala ............. G06F 11/1471 707/649 |
| 2015/0134879 | A1* | 5/2015 | Zheng .................. G06F 3/0619 711/103 |

OTHER PUBLICATIONS

Notice of Allowance dated Jun. 22, 2016 corresponding to U.S. Appl. No. 14/572,899; 7 Pages.
Gibson, "Five Point Plan Lies at the Heart of Compression Technology;" Apr. 29, 1991; p., 1.
Soules, "Metadata Efficiency in Versioning File Systems;" 2003; pp. 1-16.
AIX System Management Concepts: Operating Systems and Devices: May 2000: pp. 1-280.
Soules et al.; "Metadata Efficiency in a Comprehensive Versioning File System;" May 2002; CMU-CS-02-145; School of Computer Science, Carnegie Mellon University, Pittsburgh, PA 15213; 33 pages.
Linux Filesystems; Sams Publishing; 2002; pp. 17-22 and 67-71.
Bunyan, "Muitiplexing in a BrightStor® ARCserve® Backup Release 11;" Mar. 2004; pp. 1-4.
Marks, "Network Computing?" Feb. 2, 2006; pp. 1-8.
Hill, "Network Computing;" Jun. 8, 2006; pp. 1-9.
Microsoft Computer Dictionary; 2002; Press Fifth Edition; 2 pages.
Retrieved from http://en.wikipedia.org/wiki/DEFLATE: Deflate; Jun. 19, 2008; pp. 1-6.
Retrieved from http://en.wikipedia.org/wiki/Huffman_coding; Huffman Coding; Jun. 8, 2008; pp. 1-11.
Retrieved from http:///en.wikipedia.org/wiki/LZ77; LZ77 and LZ78; Jun. 17, 2008; pp. 1-2.
Saar Cohen, et al.; "Replicating Using Volume Multipiexing," U.S. Appl. No. 14/572,899, filed Dec. 17, 2014 51 pages.
Saar Cohen, et al.; "Providing Data Protection Using Point-In-Time Images From Multiple Types of Storage Devices," U.S. Appl. No. 14/559,031, filed Dec. 3, 2014 51 pages.
Image File Wrapper from U.S. Appl. No. 11/609,560 downloaded Jan. 7, 2015 265 pages.
Image File Wrapper from U.S. Appl. No. 12/057,652 downloaded Jan. 7, 2015 296 pages.
Image File Wrapper from U.S. Appl. No. 11/609,561 downloaded Jan. 7, 2015 219 pages.
Image File Wrapper from U.S. Appl. No. 11/356,920 downloaded Jan. 7, 2015 272 pages.
Image File Wrapper from U.S. Appl. No. 10/512,687 downloaded Jan. 7, 2015 Part 1 of 2; 300 pages.
Image File Wrapper from U.S. Appl. No. 10/612,687 downloaded Jan. 7, 2015 Part 2 of 2; 254 pages.
Image File Wrapper from U.S. Appl. No. 11/536,233 downloaded Jan. 7, 2015 256 pages.
Image File Wrapper from U.S. Appl. No. 11/536,215 downloaded Jan. 7, 2015 172 pages.
Image File Wrapper from U.S. Appl. No. 11/535,160 downloaded Jan. 7, 2015 230 pages.
Image File Wrapper from U.S. Appl. No. 11/964,168 downloaded Jan. 7, 2015 222 pages.
Image File Wrapper from U.S. Appl. No. 14/572,899 downloaded Jan. 12, 2015 135 pages.
Image File Wrapper from U.S. Appl. No. 14/559,031 downloaded Jan. 12, 2015 122 pages.
U.S. Office Action dated Apr. 4, 2016 corresponding to U.S. Appl. No. 14/572,899; 18 Pages.
Response to Office Action dated Apr. 4, 2016 corresponding to U.S. Appl. No. 14/572,899; Response filed Jun. 6, 2016; 10 Pages.
Response to U.S. Office Action dated Aug. 25, 2016 corresponding to U.S. Appl. No. 14/559,031; Response filed Nov. 21, 2016; 15 Pages.
Notice of Allowance dated Dec. 16, 2016 corresponding to U.S. Appl. No. 14/559,031; 11 Pages.
U.S. Appl. No. 14/496,783, filed Sep. 25, 2014, Natanzon et al.
U.S. Appl. No. 14/496,790, filed Sep. 25, 2014, Cohen et al.
U.S. Appl. No. 14/559,036, filed Dec. 3, 2014, Natanzon et al.
U.S. Appl. No. 14/753,389, filed Jun. 29, 2015, Nir et al.
U.S. Appl. No. 14/976,719, filed Dec. 21, 2015, Natanzon.
U.S. Appl. No. 14/978,378, filed Dec. 22, 2015, Bigman et al.
U.S. Appl. No. 15/085,148, filed Mar. 30, 2016, Baruch et al.
U.S. Appl. No. 15/274,362, filed Sep. 23, 2016, Baruch et al.
U.S. Appl. No. 15/275,768, filed Sep. 26, 2016, Natanzon et al.
U.S. Appl. No. 15/275,756, filed Sep. 26, 2016, Natanzon et al.
U.S. Appl. No. 15/379,940, filed Dec. 15, 2016, Baruch et al.
U.S. Appl. No. 15/386,754, filed Dec. 21, 2016, Shemer et al.
U.S. Appl. No. 15/380,013, filed Dec. 15, 2016, Baruch et al.
U.S. Appl. No. 15/390,996, filed Dec. 27, 2016, Natanzon et al.
U.S. Appl. No. 15/391,030, filed Dec. 27, 2016, Shemer et al.
U.S. Appl. No. 15/970,243, filed May 3, 2018, Schneider et al.
U.S. Appl. No. 16/052,037, filed Aug. 1, 2018, Schneider et al.
U.S. Appl. No. 16/048,763, filed Jul. 30, 2018, Schneider et al.
U.S. Appl. No. 16/050,400, filed Jul. 31, 2018, Alkalay et al.
U.S. Appl. No. 16/179,295, filed Nov. 2, 2018, Natanzon et al.
U.S. Appl. No. 16/368,008, filed Mar. 28, 2019, Natanzon et al.
U.S. Appl. No. 16/261,174, filed Jan. 29, 2019, Natanzon et al.

\* cited by examiner

STORING SNAPSHOT CHANGES WITH SNAPSHOTS

BACKGROUND

Computer data is vital to today's organizations and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Another conventional data protection system uses data replication, by generating a copy of production site data of an organization on a secondary backup storage system, and updating the backup with changes. The backup storage system may be situated in the same physical location as the production storage system, or in a physically remote location. Data replication systems generally operate either at the application level, at the file system level, or at the data block level.

SUMMARY

In one aspect, a method includes sending a first snapshot of a volume at a production site to a backup device at a replication site, sending a second snapshot of the volume to the backup device and sending metadata of differences between the first and second snapshots to the backup device.

In another aspect, an apparatus includes electronic hardware circuitry configured to send a first snapshot of a volume at a production site to a backup device at a replication site, send a second snapshot of the volume to the backup device and send metadata of differences between the first and second snapshots to the backup device.

In a further aspect, an article includes a non-transitory computer-readable medium that stores computer-executable instructions. The instructions cause a machine to send a first snapshot of a volume at a production site to a backup device at a replication site, send a second snapshot of the volume to the backup device and send metadata of differences between the first and second snapshots to the backup device.

DETAILED DESCRIPTION

Figure 1:
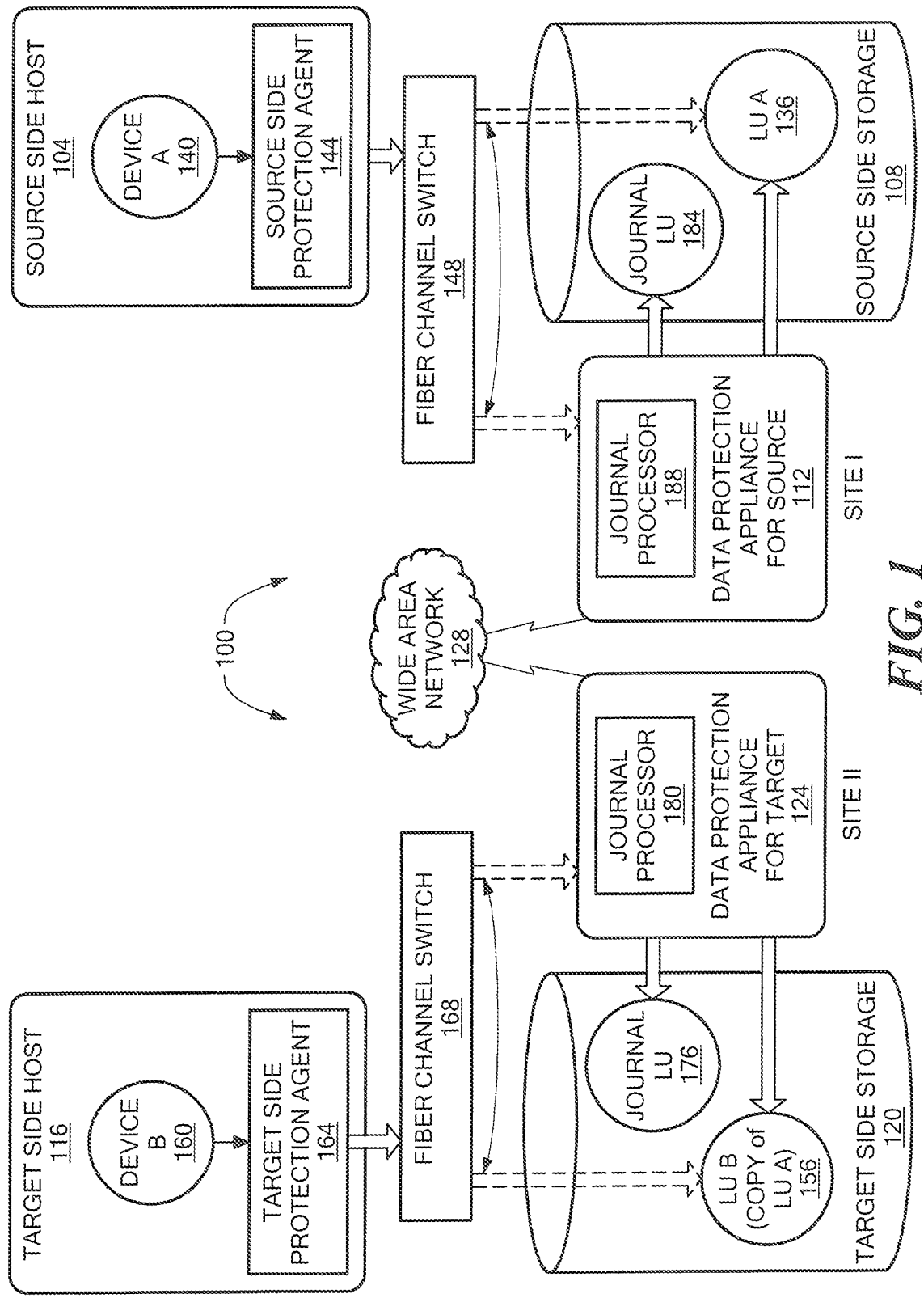
FIG. 1 is a block diagram of an example of a data protection system.

Described herein are techniques to perform snapshot replication while saving differences between snapshots.

The following definitions may be useful in understanding the specification and claims.

BACKUP SITE—a facility where replicated production site data is stored; the backup site may be located in a remote site or at the same location as the production site; a backup site may be a virtual or physical site.

BOOKMARK—a bookmark is metadata information stored in a replication journal which indicates a point in time.

CDP—Continuous Data Protection, a full replica of a volume or a set of volumes along with a journal which allows any point in time access, the CDP copy is at the same site, and maybe the same storage array of the production site.

DATA PROTECTION APPLIANCE (DPA)—a computer or a cluster of computers, or a set of processes that serve as a data protection appliance, responsible for data protection services including inter alia data replication of a storage system, and journaling of I/O requests issued by a host computer to the storage system. The DPA may be a physical device, a virtual device running, or may be a combination of a virtual and physical device.

DEDUPLICATED STORAGE SYSTEM—any storage system capable of storing deduplicated or space reduced data, and in some examples, is an EMC® DataDomain® system. Deduplicated data may also be any data that is processed to remove redundant data.

HOST—at least one computer or networks of computers that runs at least one data processing application that issues I/O requests to one or more storage systems; a host is an initiator with a SAN.

HOST DEVICE—an internal interface in a host, to a logical storage unit.

IMAGE—a copy of a logical storage unit at a specific point in time.

INITIATOR—a node in a SAN that issues I/O requests.

I/O REQUEST—an input/output request (sometimes referred to as an I/O or IO), which may be a read I/O request (sometimes referred to as a read request or a read) or a write I/O request (sometimes referred to as a write request or a write).

JOURNAL—a record of write transactions issued to a storage system; used to maintain a duplicate storage system, and to roll back the duplicate storage system to a previous point in time.

LOGICAL UNIT—a logical entity provided by a storage system for accessing data from the storage system. The logical disk may be a physical logical unit or a virtual logical unit.

LUN—a logical unit number for identifying a logical unit.

PHYSICAL LOGICAL UNIT—a physical entity, such as a disk or an array of disks, for storing data in storage locations that can be accessed by address.

PRODUCTION SITE—a facility where one or more host computers run data processing applications that write data to a storage system and read data from the storage system.

REMOTE ACKNOWLEDGEMENTS—an acknowledgement from remote DPA to the local DPA that data arrived at the remote DPA (either to the appliance or the journal).

SNAPSHOT—a snapshot is an image or differential representations of an image, i.e., the snapshot may have pointers to the original volume, and may point to log volumes for changed locations. Snapshots may be combined into a snapshot array, which may represent different images over a time period.

SPLITTER/PROTECTION AGENT—is an agent running either on a production host a switch or a storage array which can intercept I/Os and split them to a DPA and to the storage array, fail I/Os, redirect I/Os or do any other manipulation to the I/O; the splitter or protection agent may be used in both physical and virtual systems. The splitter may be in the I/O stack of a system and may be located in the hypervisor for virtual machines. In some examples, a splitter may be referred to as an Open Replicator Splitter (ORS).

SPLITTER ACKNOWLEDGEMENT—an acknowledgement from a DPA to the protection agent (splitter) that data has been received at the DPA; this may be achieved by an SCSI status command.

SAN—a storage area network of nodes that send and receive an I/O and other requests, each node in the network being an initiator or a target, or both an initiator and a target.

SOURCE SIDE—a transmitter of data within a data replication workflow, during normal operation a production site is the source side; and during data recovery a backup site is the source side, sometimes called a primary side. Source side may be a virtual or physical site.

STORAGE SYSTEM—a SAN entity that provides multiple logical units for access by multiple SAN initiators.

STREAMING—transmitting data in real time, from a source to a destination, as the data is read or generated.

SYNTHESIZE—generating a new file, for example, using pointers from existing files, without actually copying the referenced data. In one particular example, a new file representing a volume at a points-in-time may be generated using pointers to a file representing a previous point-in-time, as well pointers to journal representing changes to the volume.

TARGET—a node in a SAN that replies to I/O requests.

TARGET SIDE—a receiver of data within a data replication workflow; during normal operation a back site is the target side, and during data recovery a production site is the target side, sometimes called a secondary side. The target side may be a virtual or physical site.

THIN PROVISIONING—thin provisioning involves the allocation of physical storage when it is needed rather than allocating the entire physical storage in the beginning. Thus, use of thin provisioning is known to improve storage utilization.

THIN LOGICAL UNIT—a thin logical unit is a logical unit that uses thin provisioning.

VIRTUAL LOGICAL UNIT—a virtual storage entity which is treated as a logical unit by virtual machines.

WAN—a wide area network that connects local networks and enables them to communicate with one another, such as the Internet.

A description of journaling and some techniques associated with journaling may be described in the patent titled "METHODS AND APPARATUS FOR OPTIMAL JOURNALING FOR CONTINUOUS DATA REPLICATION" and with U.S. Pat. No. 7,516,287, which is hereby incorporated by reference.

Referring to FIG. 1, a data protection system 100 includes two sites; Site I, which is a production site, and Site II, which is a backup site or replica site. Under normal operation the production site is the source side of system 100, and the backup site is the target side of the system. The backup site is responsible for replicating production site data. Additionally, the backup site enables roll back of Site I data to an earlier pointing time, which may be used in the event of data corruption of a disaster, or alternatively in order to view or to access data from an earlier point in time.

FIG. 1 is an overview of a system for data replication of either physical or virtual logical units. Thus, one of ordinary skill in the art would appreciate that in a virtual environment a hypervisor, in one example, would consume logical units and generate a distributed file system on them such as VMFS generates files in the file system and expose the files as logical units to the virtual machines (each VMDK is seen as a SCSI device by virtual hosts). In another example, the hypervisor consumes a network based file system and exposes files in the NFS as SCSI devices to virtual hosts.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks may be used.

Each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124. As well, the protection agent (sometimes referred to as a splitter) may run on the host, or on the storage, or in the network or at a hypervisor level, and that DPAs are optional and DPA code may run on the storage array too, or the DPA 124 may run as a virtual machine.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

The host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. The logical unit may be a physical logical unit or a virtual logical unit. A logical unit is identified by a unique logical unit number (LUN). Storage system 108 exposes a logical unit 136, designated as LU A, and storage system 120 exposes a logical unit 156, designated as LU B.

LU B is used for replicating LU A. As such, LU B is generated as a copy of LU A. In one example, LU B is configured so that its size is identical to the size of LU A. Thus, for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer generates a host device for each logical unit exposed by a storage system in the host computer SAN. A host device is a logical entity in a host computer, through which a host computer may access a logical unit. Host device 104 identifies LU A and generates a corresponding host device 140, designated as Device A, through which it can access LU A. Similarly, host computer 116 identifies LU B and generates a corresponding device 160, designated as Device B.

In the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail herein, when acting as a target side DPA, a DPA may also enable roll back of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands or any other protocol.

DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

Host computer 104 and host computer 116 include protection agents 144 and 164, respectively. Protection agents 144 and 164 intercept SCSI commands issued by their respective host computers, via host devices to logical units that are accessible to the host computers. A data protection agent may act on an intercepted SCSI commands issued to a logical unit, in one of the following ways: send the SCSI commands to its intended logical unit; redirect the SCSI command to another logical unit; split the SCSI command by sending it first to the respective DPA; after the DPA returns an acknowledgement, send the SCSI command to its intended logical unit; fail a SCSI command by returning an error return code; and delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. Protection agents communicate with their respective DPAs by sending SCSI commands over fiber channel.

Protection agents 144 and 164 are drivers located in their respective host computers 104 and 116. Alternatively, a protection agent may also be located in a fiber channel switch, or in any other device situated in a data path between a host computer and a storage system or on the storage system itself. In a virtualized environment, the protection agent may run at the hypervisor layer or in a virtual machine providing a virtualization layer.

What follows is a detailed description of system behavior under normal production mode, and under recovery mode.

In production mode DPA 112 acts as a source site DPA for LU A. Thus, protection agent 144 is configured to act as a source side protection agent; i.e., as a splitter for host device A. Specifically, protection agent 144 replicates SCSI I/O write requests. A replicated SCSI I/O write request is sent to DPA 112. After receiving an acknowledgement from DPA 124, protection agent 144 then sends the SCSI I/O write request to LU A. After receiving a second acknowledgement from storage system 108 host computer 104 acknowledges that an I/O command complete.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

Target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 enters write transactions received by DPA 124 from DPA 112 into the journal, by writing them into the journal LU, reads the undo information for the transaction from LU B. updates the journal entries in the journal LU with undo information, applies the journal transactions to LU B, and removes already-applied transactions from the journal.

Figure 2:
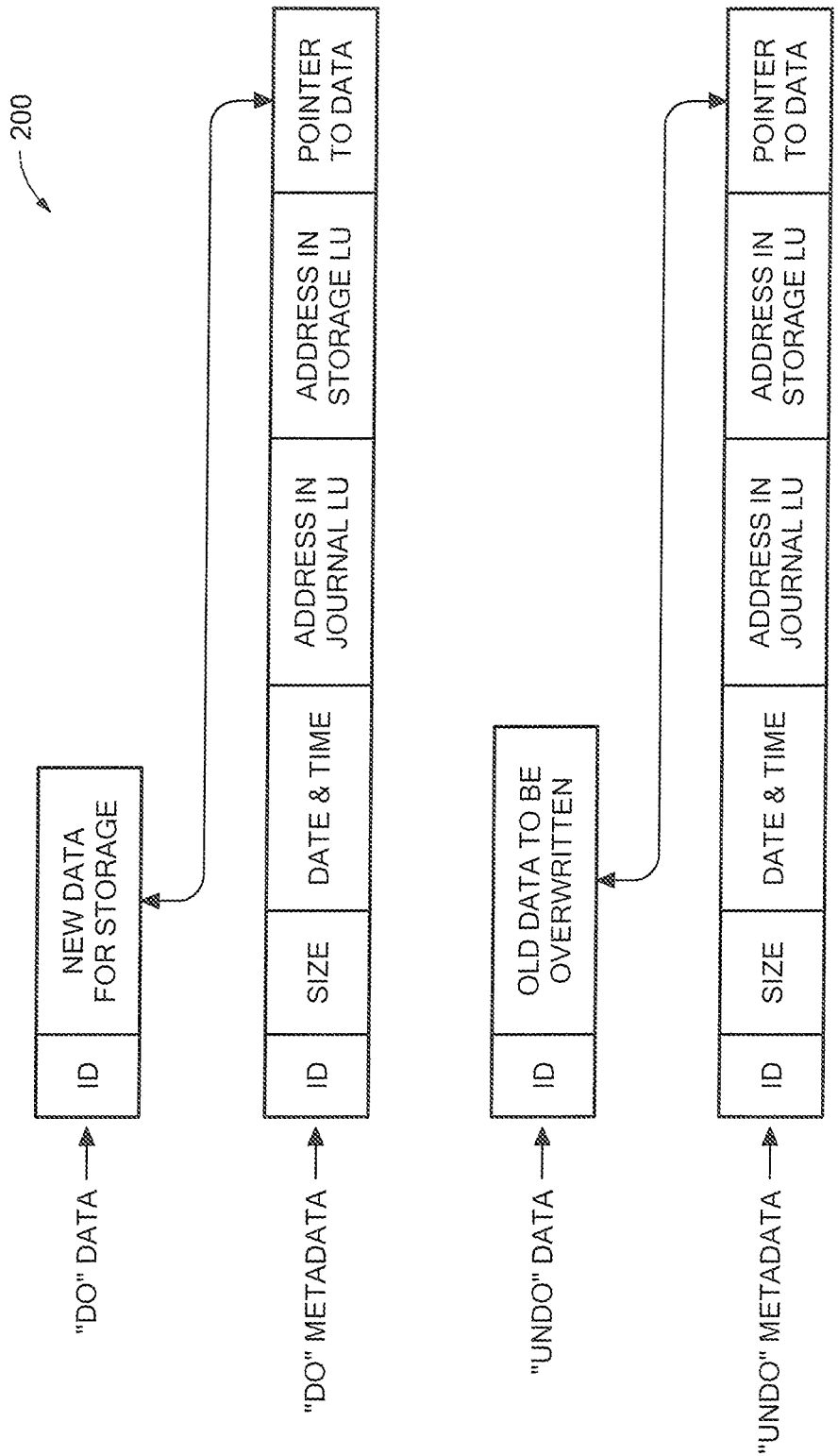
FIG. 2 is an illustration of an example of a journal history of write transactions for a storage system.

Referring to FIG. 2, which is an illustration of a write transaction 200 for a journal. The journal may be used to provide an adaptor for access to storage 120 at the state it was in at any specified point in time. Since the journal includes the "undo" information necessary to roll back storage system 120, data that was stored in specific memory locations at the specified point in time may be obtained by undoing write transactions that occurred subsequent to such point in time.

Write transaction 200 generally includes the following fields: one or more identifiers; a time stamp, which is the date & time at which the transaction was received by source side DPA 112; a write size, which is the size of the data block; a location in journal LU 176 where the data is entered; a location in LU B where the data is to be written; and the data itself.

Write transaction 200 is transmitted from source side DPA 112 to target side DPA 124. As shown in FIG. 2, DPA 124 records the write transaction 200 in the journal that includes four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the DO stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the UNDO stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream. In some examples, the metadata stream (e.g., UNDO METADATA stream or the DO METADATA stream) and the data stream (e.g., UNDO stream or DO stream) may be kept in a single stream each (i.e., one UNDO data and UNDO METADATA stream and one DO data and DO METADATA stream) by interleaving the metadata into the data stream.

Figure 3:
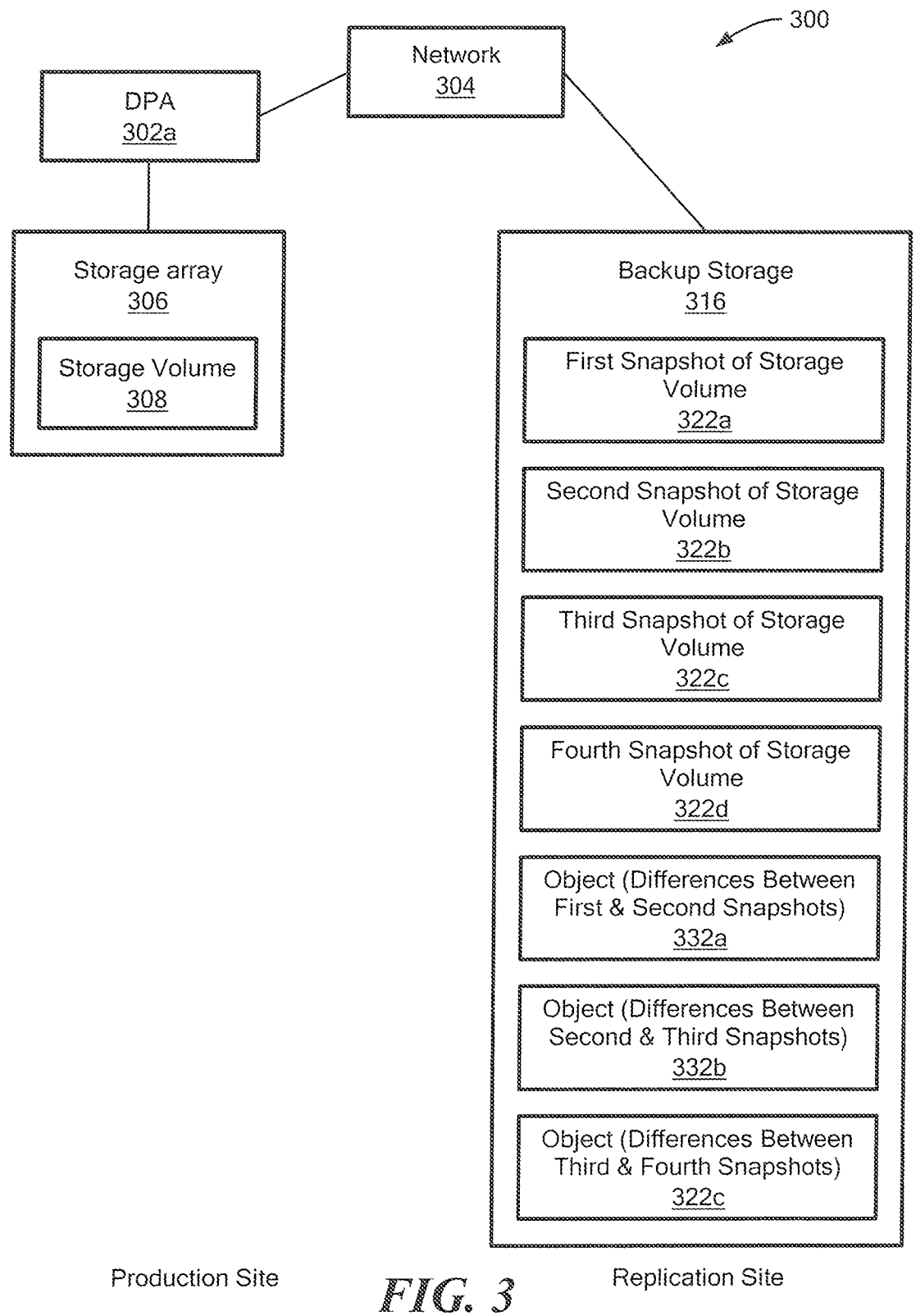
FIG. 3 is a block diagram of an example of a system to initialize a backup snapshot.

Referring to FIG. 3, a data replication system 300 includes a DPA 302a and a storage array 306 at a production site and a backup storage 316 at replication site. The DPA 302a is connected to the backup storage 316 by a network 304 (e.g., a wide area network (WAN), local area network (LAN), Internet and so forth). The storage array 306 includes a storage volume 308. The backup storage 316 includes snapshots of the storage volume (e.g., a first snapshot of the storage volume 322a, a second snapshot of the storage volume 322b, a third snapshot of the storage volume 322c and a fourth snapshot of the storage volume 322d).

The backup storage 316 also includes objects (e.g., files) that include differences between snapshots. For example, an object 332a includes differences between first and second snapshots of the volume 308, an object 332b includes differences between second and third snapshots of the volume 308 and an object 332c includes differences between third and fourth snapshots of the volume 308. In one example, the differences are represented as a metadata of differences that includes metadata of locations different between the snapshots of the volume. The objects 332a-332c may be stored as a bitmap or as a list of differences or in any other format.

In one example, the backup storage 316 is a deduplication device. In some examples, the backup storage is a device in a cloud network environment. In another example a cloud storage device is an object store.

If the storage volume 308 is completely lost then the whole replica snapshot needs to be restored to the storage volume 306; however, if there is a logical corruption of the storage volume 308 the volume 308 may be restored using partial recovery of only the corrupted blocks. That is, a replication engine (not shown) on the production site has knowledge of the current blocks which are different between the production and replica site. If the system 300 needs to restore the latest snapshot from the replica site it only needs to transmit the blocks suspected as being different between the production and replica sites. If the user wants to restore an older snapshot, then there is a need to know the differences between the latest snapshot which arrived to the replica site and the snapshot the user desires to recover. While some storage systems have the ability to deliver differences between two points-in-time, most systems, specifically cloud-based systems do not have this ability. System 300 ensures that the differences are sent to the replications site as described in FIGS. 4 to 6 herein.

Figures 4, 5:
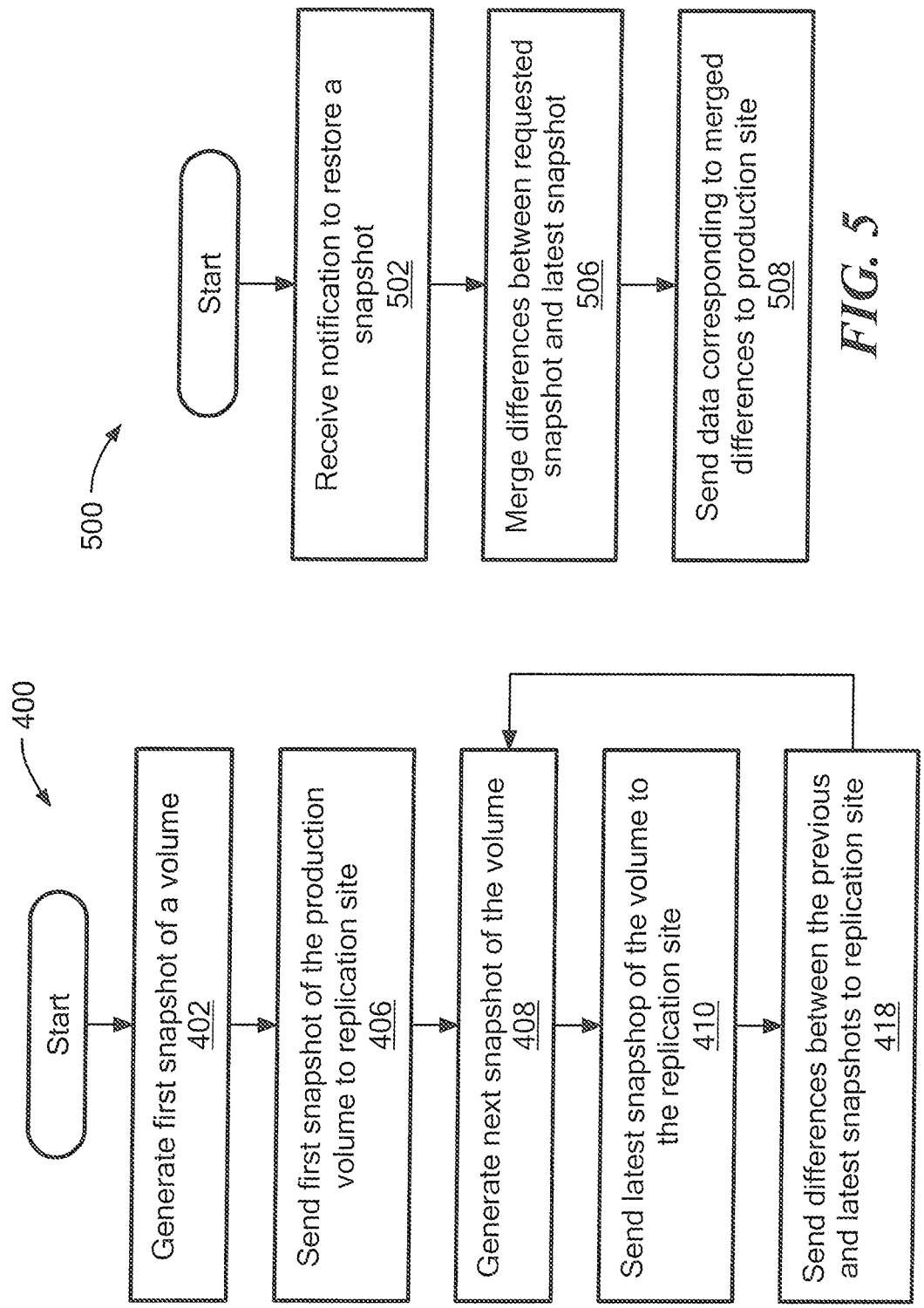
FIG. 4 is a flowchart of an example of a process to perform snapshot replication to a replication site.
FIG. 5 is a flowchart of an example of a process to restore a volume using data saved at the replication site using the process of FIG. 4.

Referring to FIG. 4, a process 400 is an example of a process to perform snapshot replication to a replication site. Process 400 generates the first snapshot of the volume (402) and sends the first snapshot to the replications site (406). For example, a snapshot of the volume 308 is taken and shipped to the backup storage 316 to be stored as the first snapshot 322a.

Process 400 generates the next snapshot of the volume (408) and sends the current snapshot to the replication site (410). For example, a snapshot of the volume 308 is taken and shipped to the backup storage 316 to be stored as the second snapshot 322b.

Process 400 sends differences between the previous snapshot and the latest snapshot to the replication site (418). For example, if the previous snapshot is the first snapshot 322a and the current snapshot is the second snapshot 322b, then the differences between the first and second snapshots are sent to the replication site and stored at the backup storage 316 as the object 332a.

Referring to FIG. 5, a process 500 is an example of a process to restore a volume using data that was saved at the replication site using the process 400. Process 500 receives notification to restore a snapshot (502). For example, a notification is received to restore the first snapshot 322a.

Process 500 merges differences between requested snapshot and the latest snapshot (506) to a unified differences list or bitmap, for example, and sends data corresponding to the merged differences to the production site (508). For example, if the first snapshot 322a is the requested snapshot to restore and if the latest snapshot is the fourth snapshot 322d, then the objects 332a-332c are merged and data corresponding to the merged differences is then copied from the replication site back to the production site (e.g., the data in the first snapshot 322a that is different from the fourth snapshot 322d and the data which changed since the first snapshot was shipped is sent to the production site).

Figure 6:
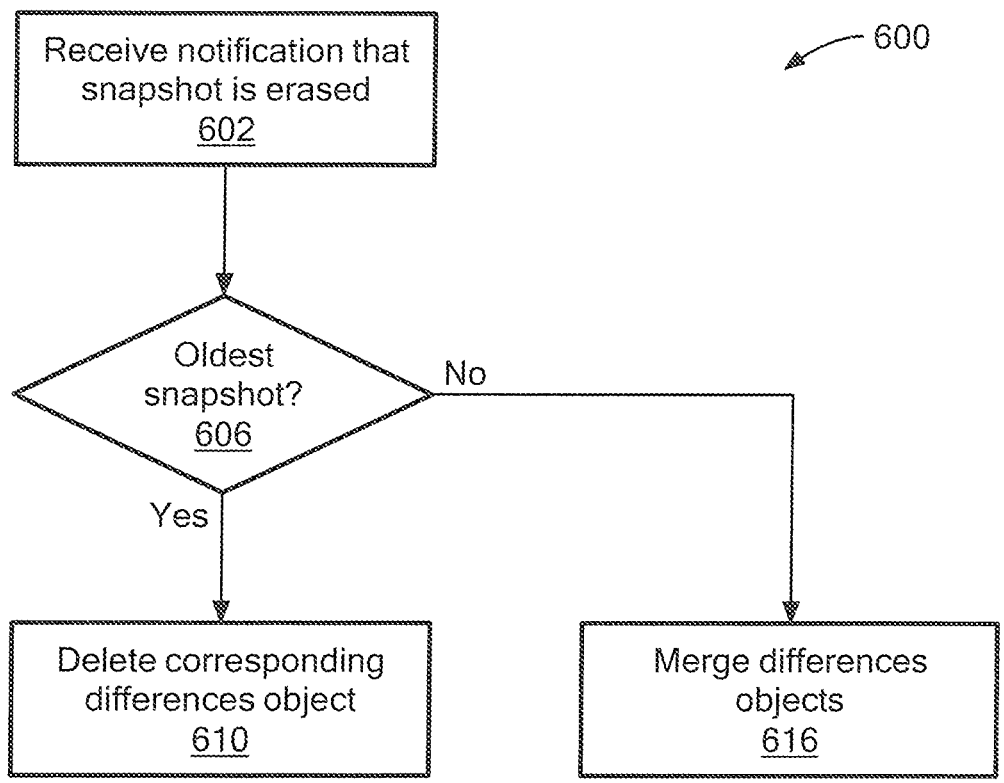
FIG. 6 is a flowchart of an example, of a process to manage a backup device after deletion of a snapshot from the replication site.

Referring to FIG. 6, a process 600 is an example of a process to manage a backup device after deletion of a snapshot from the replication site. Process 600 receives a notification that a snapshot has been erased at the replication site (602) and determines if the snapshot deleted from the replication site is the oldest snapshot (606).

If the snapshot deleted is the oldest snapshot then process 600 deletes the corresponding differences object (610). For example, if the first snapshot of the storage volume 322a is deleted from the backup storage 316 then the object 332a of the differences between the first and second snapshots is deleted.

If the snapshot deleted is not the oldest snapshot then process 600 merges the differences objects (616). For example, if the second snapshot of the storage volume 322b is deleted from the backup storage 316 then the object 332a of the differences between the first and second snapshots is merged with the object 332b of the differences between the second and thirds snapshots to a single object.

Figure 7:
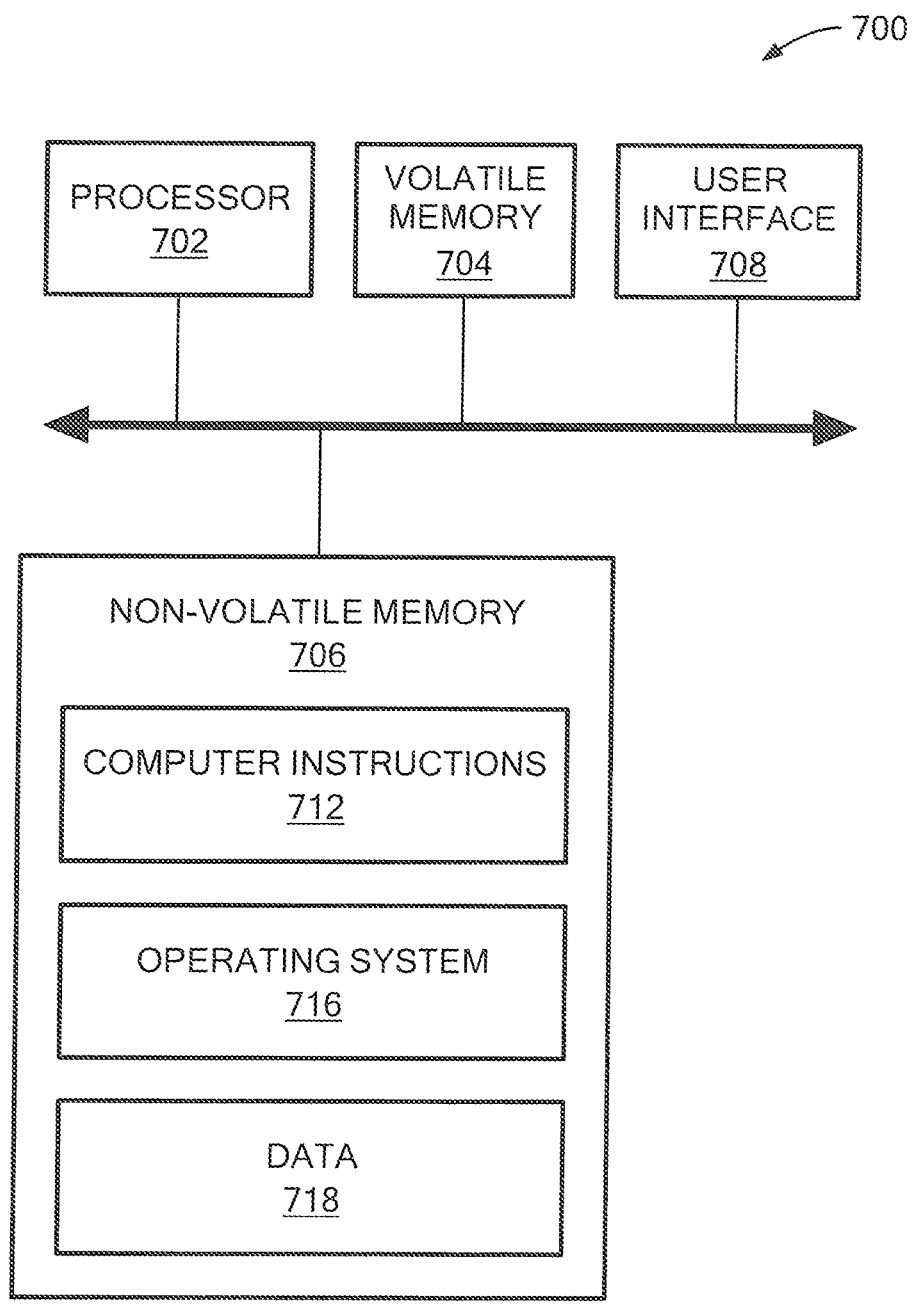
FIG. 7 is a simplified block diagram of an example of a computer on which any of the processes of FIGS. 4 to 6 may be implemented.

Referring to FIG. 7, in one example, a computer 700 includes a processor 702, a volatile memory 704, a non-volatile memory 706 (e.g., hard disk) and the user interface (UI) 708 (e.g., a graphical user interface, a mouse, a keyboard, a display, touch screen and so forth). The non-volatile memory 706 stores computer instructions 712, an operating system 716 and data 718. In one example, the computer instructions 712 are executed by the processor 702 out of volatile memory 704 to perform all or part of the processes described herein (e.g., processes 400, 500 and 500).

The processes described herein (e.g., processes 400, 500 and 500) are not limited to use with the hardware and software of FIG. 7; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 400, 500 and 500 are not limited to the specific processing order of FIGS. 4 to 6, respectively. Rather, any of the processing blocks of FIGS. 4 to 6 may be re-ordered, combined or removed, performed in parallel or in serial, as necessary, to achieve the results set forth above.

The processing blocks (for example, in the processes 400, 500 and 500) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method comprising:
taking, at a first point in time, a first snapshot of a volume on a storage array, the storage array located at a production site;
electronically sending the first snapshot of the volume through a network to a backup device at a replication site for storage on the backup device;
taking, by the production site at a second point in time, a second snapshot of the volume, the second point-in time occurring after the first point in time;
electronically sending the second snapshot of the volume through the network to the backup device for storage on the backup device; and
sending a first object comprising metadata of differences between the first and second snapshots to the backup device for storage on the backup device, wherein the metadata of differences between the first and second snapshots comprises metadata including locations different between the first and second snapshots of the volume;
sending a third snapshot of the volume to the backup device;
sending a second object comprising metadata of differences between the second and third snapshots to the backup device;
upon receiving notification indicating that a second snapshot of the volume is erased from the backup device, determining whether the second snapshot is the oldest snapshot;
if the second snapshot is not the oldest snapshot, merging the first object comprising the metadata of differences between the first and second snapshots with the second object comprising the metadata of differences between the second and third snapshots;
if the second snapshot is the oldest, deleting the second object that comprises the metadata of the differences between the second and third snapshots; and
recording write transactions for the production site via a DO metadata stream and an UNDO metadata stream, the DO metadata stream storing date and time of transaction, a write size, a beginning address in a logical unit for writing new data, and a pointer to an offset in a stream where the new data is located, the UNDO metadata stream storing a date and time of transaction, a write size of an existing transaction, and a beginning address in the logical unit in which data of the existing transaction is to be overwritten, and a pointer to the offset in an UNDO stream where corresponding data of the existing transaction is located;
wherein upon determining the second snapshot is not the oldest, the first object and the second object are merged from corresponding metadata accessed from the DO metadata stream;
wherein upon determining the second snapshot is not the oldest, the second snapshot is deleted from corresponding metadata accessed from the UNDO metadata stream.

2. The method of claim 1, further comprising:
receiving notification a first snapshot of the volume is erased from the backup device;
deleting the first object comprising the metadata of differences between the first and second snapshots if the first snapshot erased is the oldest snapshot of the volume.

3. The method of claim 1, further comprising:
receiving notification to restore a snapshot of the volume;
merging metadata of differences between a requested snapshot and a latest snapshot;
sending the merged metadata of differences to the production site; and
sending data corresponding to the differences from the replication site to the production site.

4. The method of claim 3, wherein merging the metadata of the differences comprises merging the metadata of the differences to a unified differences list or a bitmap.

5. The method of claim 1, wherein sending the first snapshot of the volume at the production site to the backup device at the replication site comprises sending the first snapshot of the volume at the production site to a backup device in a cloud networking environment.

6. The method of claim 1, wherein the first object is sent to the replication site prior to sending the third object to the replication site.

7. The method of claim 1, wherein the storage array communicates with the replication site over the network via a data protection appliance.

8. An apparatus, comprising:
electronic hardware circuitry configured to:
take, at a first point in time, a first snapshot of a volume on a storage array, the storage array located at a production site;
electronically send the first snapshot of the volume through a network to a backup device at a replication site for storage on the backup device;
take, by the production site at a second point in time, a second snapshot of the volume, the second point-in time occurring after the first point in time;
electronically send the second snapshot of the volume through the network to the backup device for storage on the backup device;
send a first object comprising metadata of differences between the first and second snapshots to the backup device for storage on the backup device, wherein the metadata of differences between the first and second snapshots comprises metadata including locations different between the first and second snapshots of the volume;
send a third snapshot of the volume to the backup device;
send a second object comprising metadata of differences between the second and third snapshots to the backup device;
upon receipt of a notification indicating that a second snapshot of the volume is erased from the backup device, determine whether the second snapshot is the oldest snapshot; and
if the second snapshot is not the oldest snapshot, merge the first object comprising the metadata of differences between the first and second snapshots with the second object comprising the metadata of differences between the second and third snapshots;
if the second snapshot is the oldest, delete the second object that comprises the metadata of the differences between the second and third snapshots;
recording write transactions for the production site via a DO metadata stream and an UNDO metadata stream, the DO metadata stream storing date and time of transaction, a write size, a beginning address in a logical unit for writing new data, and a pointer to an offset in a stream where the new data is located, the UNDO metadata stream storing a date and time of transaction, a write size of an existing transaction, and a beginning address in the logical unit in which data of the existing transaction is to be overwritten, and a pointer to the offset in an UNDO stream where corresponding data of the existing transaction is located;
wherein upon determining the second snapshot is not the oldest, the first object and the second object are merged from corresponding metadata accessed from the DO metadata stream;
wherein upon determining the second snapshot is not the oldest, the second snapshot is deleted from corresponding metadata accessed from the UNDO metadata stream.

9. The apparatus of claim 8, wherein the circuitry comprises at least one of a processor, a memory, a programmable logic device or a logic gate.

10. The apparatus of claim 8, further comprising circuitry configured to:
receive notification a first snapshot of the volume is erased from the backup device;
delete the first object comprising the metadata of differences between the first and second snapshots if the first snapshot erased is the oldest snapshot of the volume.

11. The apparatus of claim 8, further comprising circuitry configured to:
receive notification to restore a snapshot of the volume;
merge metadata of differences between a requested snapshot and a latest snapshot;
send the merged metadata of differences to the production site; and
send data corresponding to the differences from the replication site to the production site.

12. The apparatus of claim 11, wherein merging the metadata of the differences comprises merging the metadata of the differences to a unified differences list or a bitmap.

13. The apparatus of claim 8, wherein the circuitry configured to send the first snapshot of the volume at the production site to the backup device at the replication site comprises circuitry configured to send the first snapshot of the volume at the production site to a backup device in a cloud networking environment.

14. The apparatus of claim 8, wherein the first object is sent to the replication site prior to sending the third object to the replication site.

15. The apparatus of claim 8, wherein the storage array communicates with the replication site over the network via a data protection appliance.

16. An article comprising:
a non-transitory computer-readable medium that stores computer-executable instructions, the instructions causing a machine to:
take, at a first point in time, a first snapshot of a volume on a storage array, the storage array located at a production site;
electronically send the first snapshot of the volume through a network to a backup device at a replication site for storage on the backup device;
take, by the production site at a second point in time, a second snapshot of the volume, the second point-in time occurring after the first point in time;
electronically send the second snapshot of the volume through the network to the backup device for storage on the backup device;
send a first object comprising metadata of differences between the first and second snapshots to the backup device for storage on the backup device, wherein the metadata of differences between the first and second snapshots comprises metadata including locations different between the first and second snapshots of the volume;
send a third snapshot of the volume to the backup device;
send a second object comprising metadata of differences between the second and third snapshots to the backup device;
upon receipt of a notification indicating that a second snapshot of the volume is erased from the backup device, determine whether the second snapshot is the oldest snapshot;
if the second snapshot is not the oldest snapshot, merge the first object comprising the metadata of differences between the first and second snapshots with the second object comprising the metadata of differences between the second and third snapshots; and if the second snapshot is the oldest, delete the second object that comprises the metadata of the differences between the second and third snapshots; and recording write transactions for the production site via a DO metadata stream and an UNDO metadata stream, the DO metadata stream storing date and time of transaction, a write size, a beginning address in a logical unit for writing new data, and a pointer to an offset in a stream where the new data is located, the UNDO metadata stream storing a date and time of transaction, a write size of an existing transaction, and a beginning address in the logical unit in which data of the existing transaction is to be overwritten, and a pointer to the offset in an UNDO stream where corresponding data of the existing transaction is located;

wherein upon determining the second snapshot is not the oldest, the first object and the second object are merged from corresponding metadata accessed from the DO metadata stream;

wherein upon determining the second snapshot is not the oldest, the second snapshot is deleted from corresponding metadata accessed from the UNDO metadata stream.

17. The article of claim 16, further comprising instructions causing the machine to:

receive notification a first snapshot of the volume is erased from the backup device;

delete the first object comprising metadata of differences between the first and second snapshots if the first snapshot erased is the oldest snapshot of the volume.

18. The article of claim 16, further comprising instructions causing the machine to:

receive notification to restore a snapshot of the volume;

merge metadata of differences between a requested snapshot and a latest snapshot;

send the merged metadata of differences to the production site; and send data corresponding to the differences from the replication site to the production site.

19. The article of claim 16, wherein the instructions causing the machine to send the first snapshot of the volume at the production site to the backup device at the replication site comprises instructions causing the machine to send the first snapshot of the volume at the production site to a backup device in a cloud networking environment.

20. The article of claim 16, wherein the first object is sent to the replication site prior to sending the third object to the replication site.

* * * * *